(12) United States Patent
Lewis

(10) Patent No.: US 8,544,154 B2
(45) Date of Patent: ***Oct. 1, 2013

(54) CLAMP ASSEMBLY

(75) Inventor: John W. Lewis, Oklahoma City, OK (US)

(73) Assignee: Get a Grip, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,223

(22) Filed: Jun. 6, 2012

(65) Prior Publication Data

US 2012/0304426 A1     Dec. 6, 2012

Related U.S. Application Data

(63) Continuation of application No. 12/415,726, filed on Mar. 31, 2009, now abandoned, which is a continuation of application No. 11/713,395, filed on Mar. 2, 2007, now Pat. No. 7,509,713.

(51) Int. Cl.
*B66C 1/42* (2006.01)

(52) U.S. Cl.
USPC .............................. 24/488; 24/523; 294/103.1

(58) Field of Classification Search
USPC ................... 24/136 A, 115 L, 488, 490, 523, 24/524, 526; 294/114, 116, 119.1, 86.4, 294/103.1, 102.1
See application file for complete search history.

(56) References Cited

U.S. PATENT DOCUMENTS

| | | | | |
|---|---|---|---|---|
| 2,654,630 A | * | 10/1953 | Renfroe | 294/104 |
| 3,008,749 A | * | 11/1961 | Gowan | 294/86.4 |
| 4,956,899 A | * | 9/1990 | Green | 24/488 |
| 6,182,936 B1 | * | 2/2001 | Yang | 248/442.2 |

FOREIGN PATENT DOCUMENTS

JP    4-138108 U   * 12/1992
JP    2006076006 A * 3/2006

* cited by examiner

*Primary Examiner* — James Brittain
(74) *Attorney, Agent, or Firm* — Dunlap Codding, P.C.

(57) ABSTRACT

A clamp assembly selectively grips material. The clamp assembly is connectable to an object, and includes a housing and a gripping assembly. The housing has a first end, a second end, a first portion and a second portion. The first and second portions cooperate to define a material receiving slot. The first portion of the housing has an angular disposed channel and an angular disposed recessed portion. The second portion of the housing has a gripping surface. The gripping assembly is slidably disposed within the channel such that the recessed portion cooperates with the channel to define a travel path so that the gripping assembly can be selectively movable between a biased first position and a second position. In the biased first position, the gripping assembly extends into the material receiving slot. In the second position the gripping assembly is withdrawn from the material receiving slot.

5 Claims, 3 Drawing Sheets

CLAMP ASSEMBLY

CROSS REFERENCE TO RELATED APPLICATIONS

The present application is a continuation of U.S. Ser. No. 12/415,726, filed Mar. 31, 2009 now abandoned, which is a continuation of U.S. Ser. No. 11/713,395, filed Mar. 2, 2007 now U.S. Pat. No. 7,509,713, each of which is incorporated herein by reference in its entirety.

BACKGROUND OF THE INVENTION

1. Field of the Invention

The present invention relates generally to clamp assemblies, and more particularly, but not by way of limitation, to an improved clamp assembly for selectively gripping material.

2. Brief Description of the Related Art

Clamp assemblies which employ a wedging effect have been used for gripping sheet materials, including paper, metal plates, and slabs of concrete. Such clamp assemblies tend to fall into one of two categories: those that are simple in construction and those that are complex in construction. Both the simple and complex clamp assemblies are generally limited in their functionality. That is, they are usually intended to be used for a specific purpose and for gripping a specific type of material. In the case of the clamp assemblies of simple construction, they generally have less gripping power than those of more complex construction. However, the complex clamp assemblies are obviously more expensive to construct and more complicated to use.

To this end, a need exists for an effective clamp assembly that is simple in construction and which can be used on a variety of materials and at a variety of locations. It is to such a clamp assembly that the present invention is directed.

DETAILED DESCRIPTION OF THE INVENTION

Figure 1:
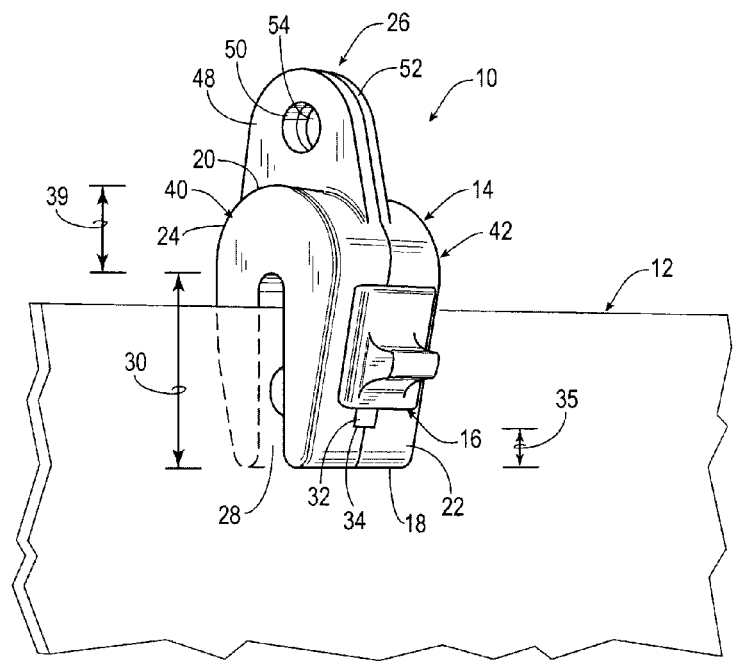
FIG. 1 is a perspective view of a clamp assembly constructed in accordance with the present invention, shown gripping a piece of material.
Figure 2:
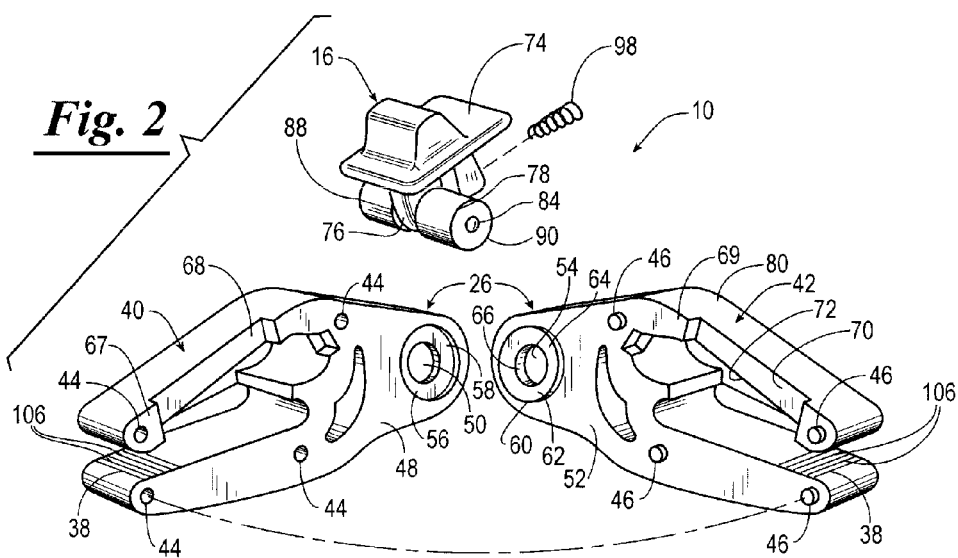
FIG. 2 is an exploded, perspective view of the clamp assembly of FIG. 1.

Referring now to the drawings, and more particularly to FIGS. 1 and 2, a clamp assembly 10 constructed in accordance with the present invention is shown gripping a material 12. The material 12 gripped by the clamp assembly 10 may be sheets of material, tarps, covers, belts, straps or the like. Material of various shapes and sizes including materials having inconsistent shapes may be gripped. It should be understood that the clamp assembly 10 may be secured to any suitable structure, such as a vehicle, including a trailer, and may be used to secure various items. In addition, it should be understood that the clamp assembly 10 is not limited to use with a vehicle, but may be connected to any structure so as to grip a desired material.

The clamp assembly 10 is desirably made of a durable, substantially rigid material which is strong enough to grip any material. Suitable materials for construction of the clamp assembly 10 and components thereof include metals such as aluminum, steel, titanium, magnesium or alloys thereof, polymeric materials, and composite materials which are capable of providing the desired strength and durability to the clamp assembly 10.

The clamp assembly 10 includes a housing 14 and a gripping assembly 16. The housing 14 of the clamp assembly is shown having a substantially U-shaped structure. While the clamp assembly 10 is shown as U-shaped, it should be understood that the clamp assembly 10 may be any shape, such as V-shaped, C-shaped, and the like, as long as the clamp assembly 10 is capable of selectively gripping material in accordance with the present invention. It is contemplated that the housing 14 is constructed from multiple components, however, it should be understood that the housing 14 may be constructed as a single component.

Referring again to FIG. 1, the housing 14 is provided with a substantially U-shaped configuration and has a first end 18, a second end 20, a first portion 22 and a second portion 24. A lug 26 extends from the second end 20 of the housing 14, substantially as shown, for selectively connecting a connecting member (not shown), such as a bungee cord, rope, strap, cable, or other suitable device to the clamp assembly 10 to enable the clamp assembly 10 to be selectively connected to a support structure (also not shown). Examples of support structures include various locations of a vehicle and stakes or rods positioned in the ground. The first and second portions 22 and 24 of the housing 14 cooperate to define a material receiving slot 28 therebetween, which extends from the first end 18 of the housing 14 and terminates a distance 30 from the second end 20 of the housing 14. The first portion 22 of the housing 14 is provided with an angularly disposed channel 32 having a first end 34 terminating a distance 35 from the first end 18 of the housing 14 and a second end 36 terminating a distance 37 from the second end 20 of the housing 14. The second portion 24 of the housing 14 defining the material receiving slot 28 is provided with a gripping surface 38 disposed along at least a portion thereof.

As more clearly shown in FIG. 2, the housing 14 is shown constructed of a first section 40 and a second section 42. The first section 40 and the second section 42 are mirror images of one another except that the first section 40 is provided with a plurality of female connector members, such as openings 44, and the second section 42 is provided with a plurality of male connector members, such as pins 46. Upon matingly disposing one of the pins 46 in one of the openings 44, the first and second sections 40 and 42 may be connected to form the housing 14 substantially as shown in FIG. 1, by use of a suitable adhesive, sonic welding, or other suitable means for securing the first and second sections 40 and 42. Furthermore, the size and shape of the openings 44 and the pins 46 may be varied.

The lug 26, which extends outwardly from the second end 20 of the housing 14, is likewise constructed of a first section 48 having an aperture 50 and a second section 52 having an aperture 54. The apertures 50 and 54 provided in the first and second sections 48 and 52 of the lug 26 are disposed substantially adjacent and the apertures 50 and 54 provided in the first and second sections 48 and 52 of the lug 26 are axially aligned substantially as shown in FIG. 1.

An inner surface 56 of the first section 48 of the lug 26 is provided with a recessed portion 58 extending about the aperture 50, and an inner surface 60 of the second section 52 of the lug 26 is provided with a recessed portion 62 extending about the aperture 54. The recessed portion 58 and 62 formed about the apertures 50 and 54 are sized to substantially receive a reinforcing member, such as a washer 64 having an aperture 66 substantially corresponding in size to the apertures 50 and 54. The washer 64 is desirably disposed within one of the recessed portions 58 and 60 of the first and second sections 48 and 52 of the lug 26, such as the recessed portion 62 on the inner surface 60 of the second section 52 of the lug 26, such that upon assembling the housing 14, the first and second sections 48 and 52 of the lug 26 are disposed substantially adjacent one another and the washer 64 is disposed within the recessed portions 58 and 62 or the washer 64 may be embedded in one of the first or second sections 48 and 52, whereby the washer 64 functions to reinforce and thus strengthening the portion of the first and second sections 48 and 52 of the lug 26 surrounding the aperture 50 and 54 in the first and second sections 48 and 52 of the lug 26.

As previously stated, the first and second sections 40 and 42 of the housing 14 are substantially mirror images of one another. Thus, an inner surface 67 of the first section 40 of the housing 14 is provided with an angularly disposed recessed portion 68 extending in a downwardly direction toward the first end 18 of the housing 14 so as to intersect the material receiving slot 28 formed by the connection of the first and second sections 40 and 42 of the housing 14. An inner surface 69 of the second section 42 of the housing is provided with an angularly disposed recessed portion 70 extending in a downwardly direction toward the first end 18 of the housing 14 so as to intersect the material receiving slot 28 formed by the connection of the first and second sections 40 and 42 of the housing 14 (See FIGS. 2, 4, and 5).

Figure 4:
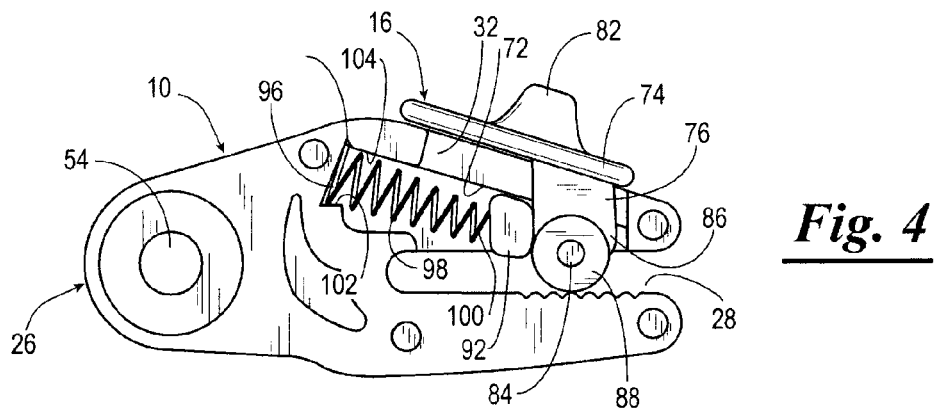
FIG. 4 is an elevational view of one section of a housing of the clamp assembly of the present invention illustrating the gripping assembly in a biased, extended material engaging position.

As shown, the angularly disposed recessed portion 68 is a mirror image of the angularly disposed recessed portion 70. Thus, in a connected position of the first and second sections 40 and 42 of the housing 14, the angularly disposed portions 68 and 70 cooperate to provide the angularly disposed channel 32 which defines a travel path for the gripping assembly 16 so that the gripping assembly 16 can be selectively moved between a biased first position as shown in FIGS. 1 and 4 wherein a portion of the gripping assembly 16 extends into the material receiving slot 28, and a second position (FIG. 5) wherein the gripping assembly 16 is withdrawn from the material receiving slot 28.

The first and second sections 40 and 42 of the housing 14 also cooperate to form a slot 72 in the first portion 22 of the housing 22. The slot 72 openingly communicates with the angularly disposed channel 32 which defines the travel path for the gripping assembly 16 and the material receiving slot 28 of the housing 14 so that the gripping assembly 16 can be selectively moved between the biased first position and the second position.

Figure 3:
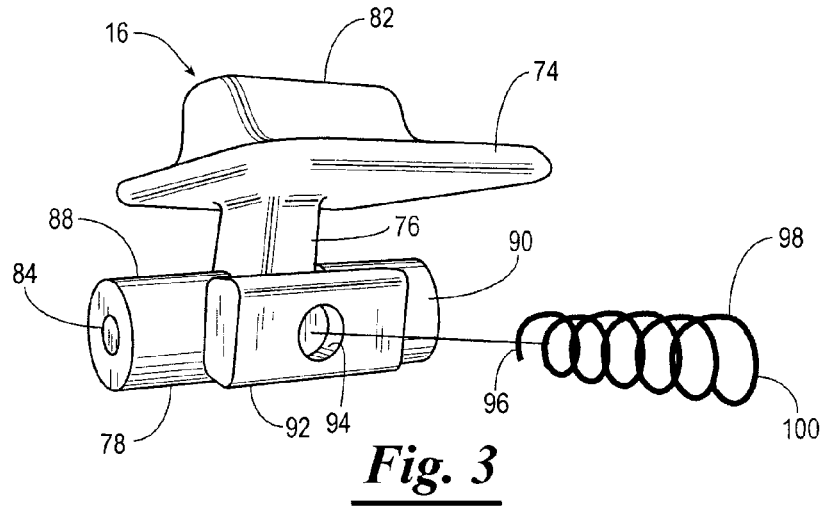
FIG. 3 is an exploded, perspective view of a gripping assembly of the clamp assembly of the present invention.
Figure 5:
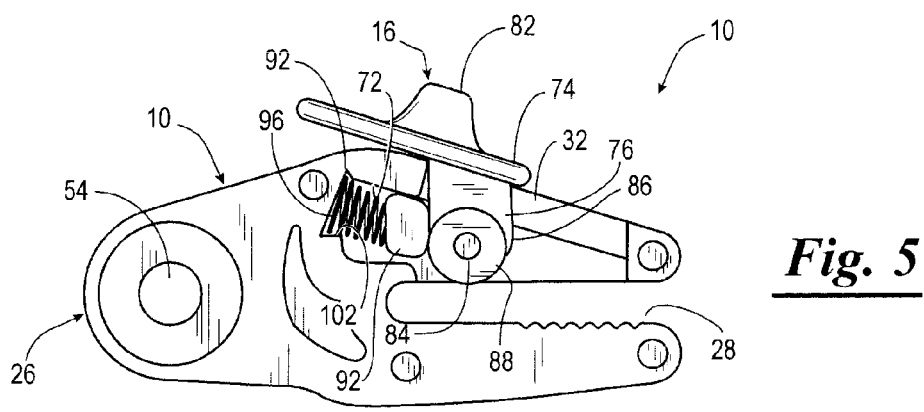
FIG. 5 is an elevational of the section of the housing of the clamp assembly of FIG. 4 in a retracted position.

Referring more specifically to FIGS. 2 and 3, the gripping assembly 16 is shown as having a guide plate 74, a neck member 76 and a roller assembly 78. The guide plate 74 is disposed on an outer surface 80 of the first portion 22 of the housing 14. A finger projection 82 extends upwardly from the guide plate 74 and the neck member 76 is connected to the guide plate 74 so that the neck member 76 extends into and through the slot 72 formed in the first portion 22 of the housing 14. The roller assembly 78 includes an axle 84 connected to a lower end portion 86 of the neck member 76 and a pair of rollers 88 and 90 connected to the axle 84 such that each roller 88 and 90 is able to rotate independently of the other roller. A spring retainer 92 is connected to the neck member 76 so as to be substantially aligned with the rollers 88 and 90 while at the same time preventing interference with the rollers 88 and 90. The spring retainer 92 is provided with an aperture 94 therein adapted to receive one end 96 of a spring 98. An opposite end 100 of the spring 98 is disposed within a recessed portion 102 formed in one end 104 of the channel 32 substantially as shown in FIGS. 4 and 5. To facilitate assembly of the spring 98 and the housing 14, the first section 48 of the housing 14 may be provided with a protrusion (not shown) that serves to extend the recessed portion 102 and support the spring 98 prior to the sections 48 and 50 being assembled. The disposition of the spring 98 within the slot 72 and its connection to the spring retainer 92 and the first portion 22 of the housing 14, together with the angular disposition of the neck member 76 and thus the roller assembly 78 to the guide plate 74, permits the roller assembly 78 to be selectively biased in a material engaging position within the material receiving slot 28 of the housing 14 while at the same time allowing the roller assembly 78 to be selectively moved to a retracted position wherein the rollers 88 and 90 are substantially removed from the material receiving slot 28.

In order to enhance the clamping abilities of the clamp assembly 10 to the material 12, at least a portion of the material receiving slot 28 formed by the second portion 24 of the housing 14 is provided with a plurality of teeth 106 (See FIGS. 2, 4 and 5), which cooperate with the rollers 88 and 90 of the roller assembly 78 to enhance gripping of material 12 disposed within the material receiving slot 28 of the housing 14. However, it should be appreciated that housing 14 may be formed without teeth so as to form a smooth surface.

To enhance the biasing of the gripping assembly 16 in the first or material engaging position, the spring 98 is desirably provided with a tapered configuration wherein a smaller end of the spring 98 is connected to the spring retainer 92 supported on the lower end portions 86 of the neck members 76 and a larger end portion is disposed within the recessed portion 102 formed in the first portion 22 of the housing 14 so that the spring 98 extends along the channel 32 formed in the housing 14.

While the spring 98 has been shown as a tapered spring, it should be understood that the spring 98 can be provided with any configuration as long as it functions to biased the rollers 88 and 90 in the first cloth receiving position as shown in FIG. 4, and at the same time allows the rollers 88 and 90 of the roller assembly 78 to be selectively withdrawn from material engaging contact from the material receiving slot 28.

Figure 6:
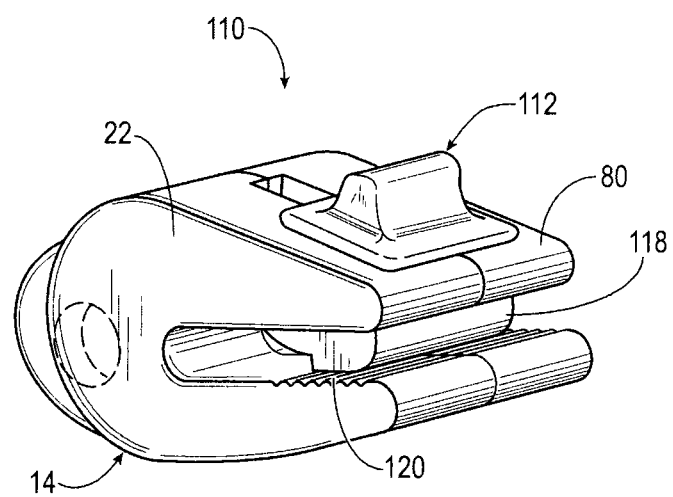
FIG. 6 is a perspective view of another embodiment of a clamp assembly constructed in accordance with the present invention.

Referring now to FIG. 6, another embodiment of a clamp assembly 110 is shown. The clamp assembly 110 is similar to the clamp assembly 10 except that the clamp assembly 110 includes a gripping assembly 112. Thus, for common components, like numbers will be used in accordance with the description of FIGS. 1-5. The gripping assembly 112 is similar to the gripping assembly 16 described above with the exception that the gripping assembly 112 includes a block member 118 instead of rollers. The block member 118 is connected to a lower end portion of the neck member (not shown) and has an engaging surface 120.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A clamp assembly for selectively gripping material, the clamp assembly comprising:

a housing having a first end, a second end, a first portion and a second portion, the first and second portions cooperating to define a material receiving slot therebetween, the material receiving slot extending from the first end of the housing and terminating a distance from the second end of the housing, the first portion of the housing having a channel angularly disposed relative to the material receiving slot and a slot formed therethrough, the channel having a first end terminating a distance from the first end of the housing and a second end terminating a distance from the second end of the housing, the second portion of the housing having a gripping surface;

a gripping assembly slidably disposed within the channel and through the slot such that the channel and the slot cooperate to define a travel path so that the gripping assembly is selectively movable between a biased first position and a second position, the gripping assembly having a guide plate disposed on an outer surface of the first portion of the housing and a neck member connected to the guide plate so that the neck member extends into and through the slot of the first portion of the housing, the gripping assembly further comprising at least two cylindrical rollers rotatably connected to a lower end portion of the neck member with at least one roller positioned on each side of the neck member in axial alignment with the other roller, in the biased first position the rollers extending into the material receiving slot in such a way as to cooperate with the gripping surface of the second portion of the housing to grip material positioned in the material receiving slot and in the second position the rollers being substantially withdrawn from the material receiving slot; and a spring positioned in the channel of the housing for biasing the gripping assembly in the biased first position, the spring having one end engaging the gripping assembly and another end engaging the second end of the housing, the spring having a tapered configuration with a smaller end engaging the gripping assembly and a larger end engaging the second end of the housing.

2. The clamp assembly of claim 1 wherein the housing is provided with a substantially U-shaped configuration.

3. The clamp assembly of claim 1 wherein the gripping surface includes a plurality of teeth.

4. The clamp assembly of claim 1 further comprising a lug extending outwardly from the second end of the housing for connecting a connecting member to the housing.

5. The clamp assembly of claim 1 wherein the larger end of the spring is positioned in a recess formed in the second end of the housing.

* * * * *